(12) United States Patent
Billhartz et al.

(10) Patent No.: US 11,783,575 B2
(45) Date of Patent: Oct. 10, 2023

(54) PERCEPTION-BASED AUTONOMOUS LANDING FOR AIRCRAFT

(71) Applicant: THE BOEING COMPANY, Chicago, IL (US)

(72) Inventors: Cullen Billhartz, Seattle, WA (US); Mary Karroqe, Glendale, NY (US); Eric R. Muir, Bothell, WA (US); Tyler Staudinger, Parker, CO (US); Nick S. Evans, Lynnwood, WA (US)

(73) Assignee: The Boeing Company, Arlington, VA (US)

( * ) Notice: Subject to any disclaimer, the term of this patent is extended or adjusted under 35 U.S.C. 154(b) by 286 days.

(21) Appl. No.: 17/364,038

(22) Filed: Jun. 30, 2021

(65) Prior Publication Data

US 2022/0067369 A1 Mar. 3, 2022

Related U.S. Application Data

(60) Provisional application No. 63/071,777, filed on Aug. 28, 2020.

(51) Int. Cl.
*G06K 9/00* (2022.01)
*G06V 20/10* (2022.01)
(Continued)

(52) U.S. Cl.
CPC ........... *G06V 20/176* (2022.01); *B64D 45/08* (2013.01); *B64D 47/08* (2013.01);
(Continued)

(58) Field of Classification Search
CPC ...... G06N 20/00; G06N 3/0454; G06N 7/005; G06N 3/08; G06N 5/003; G06N 5/04;
(Continued)

(56) References Cited

U.S. PATENT DOCUMENTS

| | | | |
|---|---|---|---|
| 2016/0093225 A1 | 3/2016 | Williams et al. | |
| 2019/0050625 A1* | 2/2019 | Reinstein | G06V 10/235 |
| 2019/0354772 A1* | 11/2019 | Tasli | G06F 18/22 |

OTHER PUBLICATIONS

Akbar, Runway Detection and Localization in Aerial Images Using Deep Learning, 2019, IEEE (Year: 2019).*
(Continued)

*Primary Examiner* — Alex Kok S Liew
(74) *Attorney, Agent, or Firm* — Alleman Hall Creasman & Tuttle LLP

(57) ABSTRACT

A method of supporting an aircraft approaching a runway is provided. Example implementations involve receiving a sequence of images, captured by a camera onboard the aircraft. Example implementations involve applying a received image to a machine learning model trained to detect the runway or a runway marking in the image, and to produce a mask that includes a segment of pixels of the image assigned to an object class for the runway or marking. Example implementations may also involve applying the mask to a corner detector to detect interest points on the mask and match the interest points to corresponding points on the runway or the marking that have known runway-framed local coordinates. Example implementations may also involve performing a perspective-n-point estimation to determine a current pose estimate of the aircraft relative to the runway or the marking and outputting the current pose estimate for use during final approach.

20 Claims, 6 Drawing Sheets

(51) Int. Cl.
  *G06T 7/11* (2017.01)
  *G06T 7/73* (2017.01)
  *G06N 20/00* (2019.01)
  *B64D 45/08* (2006.01)
  *B64D 47/08* (2006.01)
  *G06T 3/40* (2006.01)
  *G06F 18/2431* (2023.01)
  *G06F 18/2433* (2023.01)

(52) U.S. Cl.
  CPC ...... *G06F 18/2431* (2023.01); *G06F 18/2433* (2023.01); *G06N 20/00* (2019.01); *G06T 3/40* (2013.01); *G06T 7/11* (2017.01); *G06T 7/73* (2017.01); *G06T 2207/10016* (2013.01); *G06T 2207/10032* (2013.01); *G06T 2207/20081* (2013.01); *G06T 2207/20132* (2013.01); *G06T 2207/20164* (2013.01); *G06T 2207/30181* (2013.01); *G06T 2207/30204* (2013.01); *G06T 2207/30244* (2013.01)

(58) Field of Classification Search
  CPC ...... G06N 20/10; G06N 3/0445; G06N 3/084; G06N 20/20; G06N 5/022; G06N 5/046; G06N 3/006; G06N 3/0427; G06N 5/00; G06N 5/02; G06N 5/025; G06N 5/041; G06N 5/045; G06N 5/047; G06N 7/023; G10L 15/22; G10L 15/26; G10L 15/063; G10L 15/197; G10L 15/32; G10L 15/16
  See application file for complete search history.

(56) References Cited

OTHER PUBLICATIONS

Zhang, Real-time Accurate Runway Detection based on Airborne Multi-sensors Fusion, Defence Science Journal, vol. 67, No. 5, Sep. 2017, pp. 542-550, DOI : 10.14429/dsj.67.10439, 2017, DESIDOC (Year: 2017).*

Extended European Search Report dated Jan. 26, 2022 in the corresponding European Application No. 21191156.5, 11 pages.

Hiba, A., et al. Navigation data extraction from monocular camera images during final approach. 2018 International Conference on Unmanned Aircraft Systems (ICUAS), Dallas, TX, USA, Jun. 12-15, 2018, pp. 340-345.

Jiao, L. et al. A Survey of Deep Learning-based Object Detection. In IEEE Access, vol. 7, 2019, pp. 1-30, 2019. <DOI:10.1109/ACCESS.2019.2939201>.

Tremblay et al., "Deep Object Pose Estimation for Semantic RObotic Grasping of Household Objects", 2nd Conference on Robot Learning, Zurich, Switzerland, Sep. 27, 2018, 11 pages.

"How Wayfinder is Using Neural Networks for Vision-Based Autonomous Landing", Acubed, Jul. 2019, retrieved from https://acubed.airbus.com/blog/wayfinder/how-wayfinder-is-using-neural-networks-for-vision-based-autonomous-landing/, 9 pages.

"Welcome to Wayfinder", Acubed, Apr. 2019, retrieved from https://acubed.airbus.com/blog/wayfinder/welcome-to-wayfinder/, 9 pages.

Baldini et al., "Learning Pose Estimation for UAV Autonomous Navigation and Landing Using Visual-Inertial Sensory Data", Apr. 9, 2020, 8 pages.

* cited by examiner (1)

PERCEPTION-BASED AUTONOMOUS LANDING FOR AIRCRAFT

CROSS-REFERENCE TO RELATED APPLICATION(S)

This application claims priority to U.S. Provisional Application No. 63/071,777, filed Aug. 28, 2020, entitled Perception-Based Autonomous Landing for Aircraft, the content of which is incorporated herein by reference in its entirety.

TECHNOLOGICAL FIELD

The subject disclosure relates generally to aircraft operation and, in particular, to the autonomous detection of runways and runway markings.

BACKGROUND

Safe, predictable, and reliable landings are an essential aspect of an effective aircraft-based transportation system. In many situations, piloted aircraft can only land visually in high visibility and clear weather conditions. While external navigation systems, such as instrument landing systems (ILS) and global positioning systems (GPS) may be used in some contexts, some situations require visibility and cloud conditions below a specified decision altitude to permit a pilot to land visually. Even in situations where external systems may be used, those external systems are subject to outages, inaccuracies, and interference, which raise technical challenges to efforts to automate the landing process.

The technical challenges associated with automating landings or automatically generating guidance to assist a pilot during a landing are compounded by multiple factors, such as the variety and variability of weather and visibility conditions, the availability and feasibility specialized equipment at different airfields, and the robustness required of algorithmic approaches to landing operations

BRIEF SUMMARY

Example implementations of the subject disclosure are directed to the autonomous detection of runways and runway markings. Example implementations of the subject disclosure address and overcome technical challenges associated with autonomous approach and landing operations in aircraft by using a machine learning model to identify features in an image of a landing environment, determining the pose of the aircraft with respect to the landing environment, and generating the horizontal, vertical, and other positional guidance necessary to land. Some example implementations are flexible in at least the sense that such example implementations may accommodate a range of passive and active sensors, including but not limited to visual imaging devices, hyperspectral imaging devices, LIDAR, RADAR, and the like, for example, to perceive the landing environment and to determine the aircraft-relative pose, and may be used with a variety of manned and un-manned aircraft of varying size to land on visual, precision, and non-precision runways. Some example implementations are also cost-effective, at least in the sense that such example implementations do not require expensive in-ground infrastructure to be installed at a given airfield.

The subject disclosure thus includes, without limitation, the following example implementations.

Some example implementations provide a method of supporting an aircraft approaching a runway on an airfield, the method comprising receiving a sequence of images of the airfield, captured by a camera onboard the aircraft approaching the runway; and for at least an image of the sequence of images, applying the image to a machine learning model trained to perform an object detection and segmentation in which the runway on the airfield, or a runway marking on the runway, is detected in the image, and in which a mask is produced that includes a segment of pixels of the image assigned to an object class for the runway or the runway marking; applying the mask to a corner detector to detect interest points on the mask and thereby the runway or the runway marking in the image; matching the interest points on the runway or the runway marking in the image, to corresponding points on the runway or the runway marking that have known runway-framed local coordinates; performing a perspective-n-point estimation, using the interest points and the known runway-framed local coordinates, to determine a current pose estimate of the camera and thereby the aircraft relative to the runway or the runway marking; and outputting the current pose estimate for use in at least one of guidance or control of the aircraft on a final approach.

In some example implementations of the method of any preceding example implementation, or any combination of any preceding example implementations, the image is a color image, and the method further comprises converting the color image to a monochromic image.

In some example implementations of the method of any preceding example implementation, or any combination of any preceding example implementations, the method further comprises cropping the image to reduce a field of view of the camera, and magnify only a portion of the airfield on which the runway or the runway marking is located, before the image is applied to the machine learning model.

In some example implementations of the method of any preceding example implementation, or any combination of any preceding example implementations, the method further comprises accessing an earlier image in the sequence of images, and an earlier mask includes a respective segment of pixels of the earlier image assigned to the object class for the runway or the runway marking; and identifying a portion of the earlier image that frames the earlier mask, and thereby the portion of the airfield on which the runway is located, and wherein cropping the image comprises cropping the image to a portion of the image that corresponds to the portion of the earlier image.

In some example implementations of the method of any preceding example implementation, or any combination of any preceding example implementations, the object detection and segmentation is a one-class object detection and segmentation in which only the runway or the runway marking is detected in the image, and the mask only includes the segment of pixels of the image assigned to the object class for the runway or the runway marking.

In some example implementations of the method of any preceding example implementation, or any combination of any preceding example implementations, the object detection and segmentation is a multi-class object detection and segmentation in which the runway and the runway marking are detected in the image, and the mask includes segments of pixels of the image assigned to object classes for the runway and the runway marking, the interest points including interest points on the runway and the runway marking.

In some example implementations of the method of any preceding example implementation, or any combination of any preceding example implementations, the method further comprises determining an operational state of the aircraft;

and based on the operational state, selecting a first machine learning model or a second machine learning model as the machine learning model to which the image is applied, the first machine learning model trained to perform a one-class object detection and segmentation, and the second machine learning model trained to perform a multi-class object detection and segmentation.

In some example implementations of the method of any preceding example implementation, or any combination of any preceding example implementations, the machine learning model further determines a confidence interval associated with detection of the runway or the runway marking, and the method further comprises applying the mask to a confidence filter that passes the mask to the corner detector only when the confidence interval is above a threshold confidence interval that is dynamically set based on an operational state of the aircraft.

In some example implementations of the method of any preceding example implementation, or any combination of any preceding example implementations, performing the perspective-n-point estimation comprises determining the current pose estimate of the camera in camera coordinates, and transforming the camera coordinates to corresponding runway-framed local coordinates that are output for use in the at least one of guidance or control of the aircraft.

In some example implementations of the method of any preceding example implementation, or any combination of any preceding example implementations, performing the perspective-n-point estimation further comprises determining a confidence interval associated with the current pose estimate, and the method further comprises: accessing one or more additional pose estimates and associated confidence intervals; performing a sensor fusion of the current pose estimate and the one or more additional pose estimates, using the confidence interval and the associated confidence interval, to generate an updated current pose estimate; and outputting the updated current pose estimate for use in the at least one of guidance or control of the aircraft.

Some example implementations provide an apparatus for supporting an aircraft approaching a runway on an airfield, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for supporting an aircraft approaching a runway on an airfield, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the subject disclosure will be apparent from a reading of the following detailed description together with the accompanying figures, which are briefly described below. The subject disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
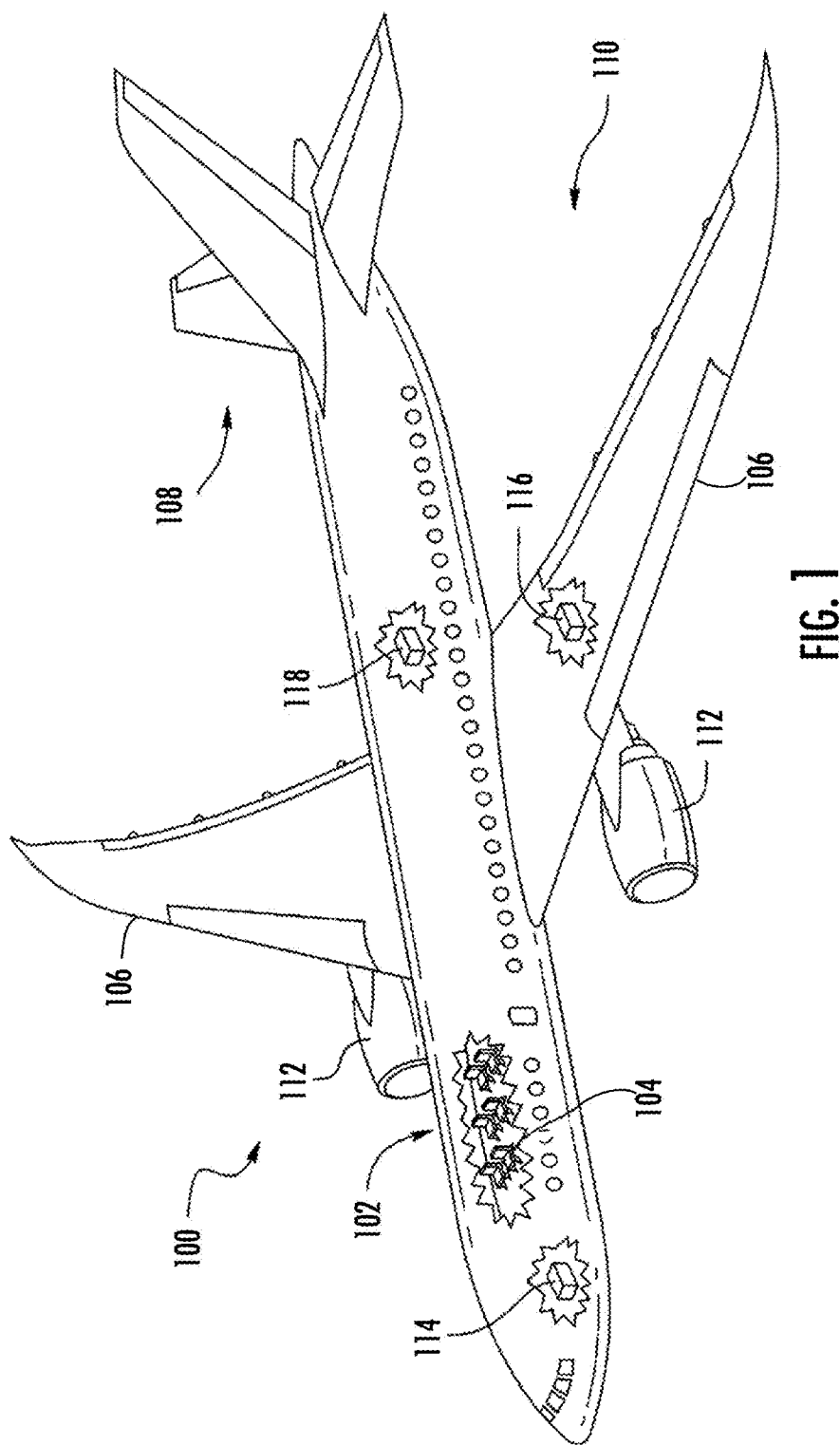
FIG. 1 illustrates an example aircraft that can benefit from example implementations of the subject disclosure.

Some implementations of the subject disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout. To the extent that terms "includes," "including," "has," "contains," and variants thereof are used herein, such terms are intended to be inclusive in a manner similar to the term "comprises" as an open transition word without precluding any additional or other elements.

Example implementations of the subject disclosure are directed to the autonomous detection of runways (and/or heliports) and runway markings. To address and overcome technical challenges associated with autonomous approach and landing operations in aircraft, example implementations of the subject disclosure involve the use of a machine learning model to identify features in an image of a landing environment, and then determine the pose of the aircraft with respect to the landing environment in order to generate the horizontal, vertical, and other positional guidance necessary to land.

Conventional approaches to using computer-generated assistance for landing operations use resource-intensive, rule-based algorithms to provide limited detection of edges of runways. These rule-based, resource-intensive approaches to runway detection lack the robustness necessary for realistic implementation for many aircraft and airfields. In particular, some conventional approaches require prior knowledge of runway characteristics, such as the location, orientation, length, width, marking type, and surface material of a given runway, and often require expensive in-ground equipment to be fitted at an airfield. Such approaches are not readily generalized to new runways, and can be less effective in situations where an aircraft is redirected to a new or different airfield. Moreover, even in instances where a portion of a runway is detected, conventional approaches lack the ability to leverage such detection into effective guidance and control of an aircraft on approach to the airfield.

Example implementations of the subject disclosure combine computer vision techniques with machine learning perception technologies in an approach that allows for a diverse set of runways, runway markings, runway corners, threshold markings, aim-pads, and the like to be identified under a wide array of visibility conditions. Some example implementations accommodate a range of passive and active sensors, including but not limited to visual imaging devices, hyperspectral imaging devices, LIDAR, RADAR, and the like, for example, to perceive the landing environment and to determine the aircraft-relative pose, and can be used with a variety of manned and un-manned aircraft of varying size to land on visual, precision, and non-precision runways.

Some example implementations involve a convolutional neural network as part of a multi-modal approach to detecting runways and/or features of runways. In some situations, example implementations of the subject disclosure supplement visual data with LIDAR and/or RADAR distance measurements of the ground and relevant obstacles. Regardless of the underlying source of the visual and/or supplemental data used, example implementations of the subject disclosure are configured to generate and provide accurate and precise pose estimations and guidance without the need for extensive prior knowledge of a runway or expensive in-ground infrastructure to be installed at a given airfield.

FIG. 1 illustrates an aircraft 100 that can benefit from example implementations of the subject disclosure. As shown, the aircraft includes an airframe 102 with a fuselage 104, wings 106 and tail 108. The aircraft also includes a plurality of high-level systems 110 such as a propulsion system 112, an electrical system 114, hydraulic system 116 and/or environmental system 118. Any number of other systems can be included with the aircraft.

Figure 2:
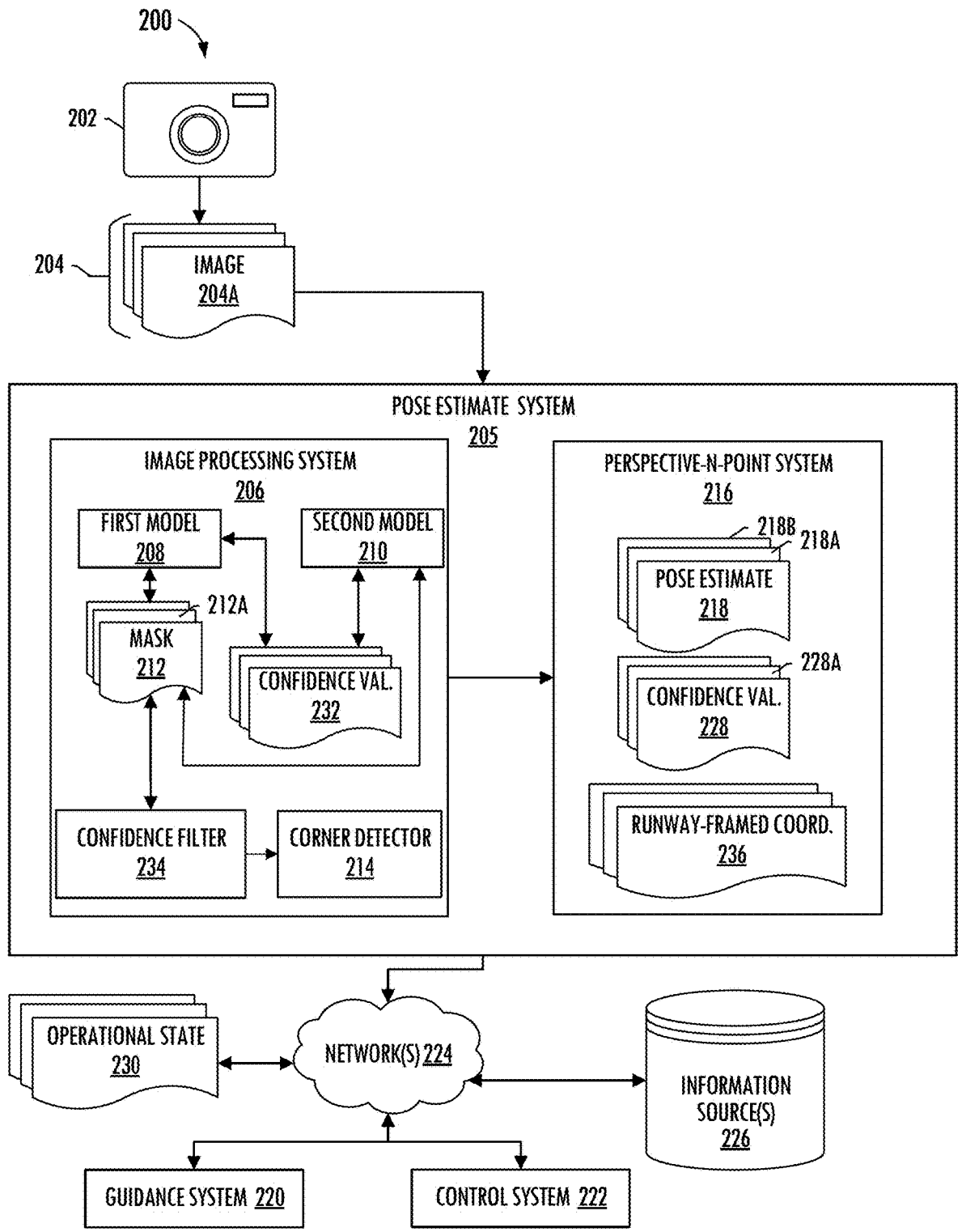
FIG. 2 is a is a block diagram of a system for supporting an aircraft approaching a runway on an airfield, according to example implementations of the subject disclosure.

FIG. 2 illustrates a system 200 for supporting an aircraft approaching a runway, according to example implementations of the subject disclosure. The system 200 can include any of a number of different subsystems (each an individual system) for performing one or more functions or operations. As shown, in some examples, the system 200 includes one or more cameras 202 which are located on an aircraft and configured to produce a sequence of images 204, a pose estimate system 205, an image processing system 206, a first machine learning model 208 and a second machine learning model 210, which are configured to produce one or more masks 212 that can be applied to images, a corner detector 214, a perspective-n-point system 216, which is configured to generate one or more pose estimates 218, a guidance system 220, and a control system 222. The subsystems including the camera, image processing system, first machine learning model, second machine learning model, corner detector, perspective-n-point system, guidance system, and control system can be co-located or directly coupled to one another, or in some examples, various ones of the subsystems can communicate with one another across one or more computer networks 224. In some example implementations, any of the subsystems can access and/or otherwise interact with one or more additional information sources 226, any of which can be co-located or directly coupled to one another and/or system elements, or accessible via a computer network and/or a cloud-based architecture.

Further, although shown as part of the system 200, it should be understood that any one or more of the above can function or operate as a separate system without regard to any of the other subsystems. It should also be understood that the system can include one or more additional or alternative subsystems than those shown in FIG. 2.

In example implementations of the subject disclosure, one or more elements from system 200 can be placed on or otherwise added to an aircraft, such as the aircraft 100 shown in FIG. 1. In such example implementations, the system 200 and any of its elements can communicate with and/or otherwise interact with any of the systems 110 of the aircraft 100. For example, the camera 202 can be mounted to the aircraft 100 in a configuration that allows the camera to capture a sequence of images 204 of the environment in the direction of travel of the aircraft 100. In some such example implementations, the pose estimate system 205, which is configured to incorporate the image processing system 206 and/or the perspective-n-point system 216 (both of which can also be incorporated into the aircraft 100), provide information to the guidance system 220 on the aircraft 100 and/or the control system 222 of the aircraft 100 to assist in the landing of the aircraft 100.

In some example implementations, while the aircraft 100 is approaching a runway at an airfield, the system 200 is configured to receive a sequence of images 204 of the airfield. In some such example implementations, the sequence of images is captured by the camera 202, which is onboard the aircraft 100 approaching the runway.

The camera 202 can be any camera capable of capturing a sequence of images, including but not limited to visual imaging devices, hyperspectral imaging devices, LIDAR imaging devices, RADAR imaging device, and the like. In some situations, the camera 202 is mounted to and/or otherwise incorporated into the aircraft 100 in a configuration that allows the camera to capture a view of the environment ahead of the aircraft 100 in the direction of travel of the aircraft 100.

In some example implementations, for at least one image 204A of the sequence of images 204, the system 200 is configured to apply the image to a machine learning model, such as the first machine learning model 208 or the second machine learning model 210, for example, that is trained to perform an object detection and segmentation in which the runway on the airfield, or a runway marking on the runway, is detected in the image. In some example implementations, the first machine learning model 208 and/or the second machine learning model 210 incorporates a convolution neural network. It will be appreciated that any neural network or other machine learning model type can be used in example implementations of the system 200.

In some example implementations, the image 204A can be processed, such as by the image processing system 206, for example prior to, in parallel with, and/or after the application of the image 204A to one or more machine learning models 208, 210. For example, in some example implementations, the image 204A is a color image, and image processing system 206 and/or another aspect of the system 200 is configured to convert the color image to a monochromic image.

In some example implementations, the image processing system 206 and/or another aspect of the system 200 is configured to further crop the image 204A to reduce a field of view of the camera 202 and magnify only a portion of the airfield on which the relevant runway or the relevant runway marking is located. In some such example implementations, the cropping of the image 204A is performed before the image 204A is applied to the machine learning model 208 and/or 210.

In some example implementations, the first machine learning model 208 and/or the second machine learning model 210, are configured to produce at least one mask 212. In some example implementations, the mask 212 is produced such that it is configured to include a segment of pixels of the image 204A assigned to an object class for the relevant runway or the relevant runway marking. In some example implementations, the mask 212 is stored and can be made accessible to the system 200 and/or another system for use with a subsequent sequence of images.

In some example implementations of the system 200, the object detection and segmentation performed by the first machine learning model 208 or the second machine learning model 210 is a one-class object detection and segmentation in which only the runway or the runway marking is detected in the image 204A. In some such example implementations, the produced mask 212 only includes the segment of pixels of the image 204A assigned to the object class for the runway or the runway marking.

Some example implementations involve an instance-wise multi-class object detection and segmentation. In some example implementations of the system 200, the object detection and segmentation performed by the first machine learning model 208 or the second machine learning model 210 is a multi-class object detection and segmentation in which the runway and the runway marking are detected in the image 204A, and the mask 212 includes segments of pixels of the image 204A assigned to object classes for the runway and the runway marking. In some such example implementations, interest points identified in the image include interest points on the runway and the runway marking.

In some example implementations, the system 200 is configured to apply the mask 212 to a corner detector 214. In some such example implementations, the corner detector is configured to detect interest points on the mask 212 and thereby detect interest points on the runway or the runway marking in the image 204A. In some example implementations, the interest points can coincide with portions of the runway itself, such as corners, edges, or other features of the runway. In some example implementations, the interest points can coincide with portions of runway markings, such as alignment pads, letters, numbers, geometric shapes, and the like that are present on a given runway.

As such, in some example implementations, the system 200 is further configured to match the interest points on the runway or the runway marking in the image 204A, to corresponding points on the runway or the runway marking that have known runway-framed local coordinates. It will be appreciated that, in order to provide accurate and precise information that can be used in the guidance or control of the aircraft 100 during a landing operation, it may be necessary for the system to determine how the appearance and relative positioning of runway-related elements and/or runway marking-related elements in a given image correspond to the actual appearance and relative positioning of those elements on the runway itself.

In example implementations where the runway-framed local coordinates are known, those known, runway-framed local coordinates can be matched by the image processing system 206 or another component of system 200 to corresponding points in the image. For example, the runway-framed local coordinates may be previously captured or otherwise determined for a given runway, such as by ascertaining the location of various symbols, lights, equipment, or other runway markings that remain in a given position with respect to the runway. In some example implementations, the runway-framed local coordinates are stored in a local data store, and/or are accessed from a remote data store by the system 200 in advance of attempting to land on the given runway. In some example implementations, information from one or more additional information sources 226 can be used in connection with the machine learning models 208, 210 and/or the corner detector 214 to identify and/or match interest points in the image to corresponding points on the runway. Such additional information can include, for example, global positioning system information, missed approach point (MAP) information, Instrument Landing System (ILS) information, and the like.

As shown in FIG. 2, the image processing system 206 is shown as incorporating at least the first machine learning model 208, the second machine learning model 210, and the corner detector 214, such that the image processing systems is configured to receive a sequence of images 204 and process at least one of the received images by applying the image(s) 204 to a machine learning model, producing a mask 212, applying the mask 212 to a corner detector 214, and otherwise process a received image 204A. It will be appreciated that, in some example implementations, the image processing system 206 and/or its component elements can be implemented as separately and/or in different groupings, and can incorporate additional elements.

Regardless of the precise configuration of the image processing system 206 and its related elements, some example implementations of the system 200 are also configured to perform a perspective-n-point estimation. In some such example implementations, the system 200, such as through the operation of the perspective-n-point system 216, is configured to use the interest points and the known runway-framed local coordinates to determine a current pose estimate 218 of the camera 202 and thereby the aircraft 100 relative to the runway or the runway marking.

In some example implementations, the perspective-n-point system 216 is configured to determine the current pose estimate 218 of the camera 202 in camera coordinates, and transform the camera coordinates to corresponding runway-framed local coordinates 236 that are output for use in the at least one of guidance or control of the aircraft 100. In some such example implementations, the runway-framed local coordinates are passed from the perspective-n-point system 216 to the guidance system 220, the control system 222, and/or another high level system 110 of the aircraft 100.

In some example implementations, the perspective-n-point system 216 is further configured to determine a confidence interval 228 associated with the current pose estimate 218. In some example implementations, the confidence interval can be a confidence value and/or a multi-dimensional confidence matrix.

In some such example implementations, the system 200 is further configured to access one or more additional pose estimates 218A and associated confidence intervals 228A. The system 200 can then perform a sensor fusion of the current pose estimate 218 and the one or more additional pose estimates 218A, using the confidence interval 228 and the associated confidence interval, to generate an updated current pose estimate 218B. In some such example implementations, the system is further configured to output the updated current pose estimate 218B for use in the at least one of guidance or control of the aircraft 100, such as by providing the updated pose estimate to the guidance system 220, the control system 222, or another high-level system 110 of the aircraft 100.

In some such example implementations, the system 200 is further configured to output the current pose estimate 218 for use in at least one of guidance or control of the aircraft 100 on a final approach. For example, the current pose estimate is passed by the perspective-n-point system 216 to the guidance system 220 of the aircraft, the control system 222 of the aircraft 100, and/or another high-level system 110 of the aircraft 100, where it can be used in autonomous landing operations and/or to support a pilot performing landing operations.

In some example implementations, the system 200 is configured to iteratively process images 204 captured by the camera 202. In some such example implementations the image processing system 206 and/or another aspect of the system 200 is configured to access an earlier image, such as image 204B in the sequence of images. The system can also access an earlier mask, such as mask 212A, that includes a respective segment of pixels of the earlier image assigned to the object class for the relevant runway or the runway marking. By accessing the earlier image and the earlier mask, the system 200 can be configured to identify a portion of the earlier image that frames the earlier mask, and thereby the portion of the relevant airfield on which the runway is located. In example implementations that involve cropping an image, such as image 204A, the system 200 can be configured to crop the image to a portion of the image that corresponds to the portion of the earlier image.

In some example implementations, the system 200 uses and generates additional information that can be used in conjunction with the received images 204, masks 212, and pose estimates 218 to provide guidance and or control information to support the landing operations of an aircraft 100. In some such example implementations, the system is configured to determine an operational state 230 of the aircraft, such as the status of the propulsion system 112, an electrical system 114, hydraulic system 116, the environmental system 118 and/or any of the high-level systems 110. In some such example implementations, the image processing system 206 or other aspect of system 200 is configured to select, based on the operational state, the first machine learning model 208 or the second machine learning model 208 as the machine learning model to which the image 204A is applied. For example, the first machine learning model 208 can be configured and trained to perform a one-class object detection and segmentation, and the second machine learning model 208 can be configured and trained to perform a multi-class object detection and segmentation. In some example implementations, the operational state of the aircraft 100 is determined based on information gained from one or more of the high-level systems 110.

In another example implementation where the system 200 uses and generates additional information, a given machine learning model, such as the first machine learning model 208 or the second machine learning model 210, for example, is further configured to determine a confidence interval 232 associated with the detection of the relevant runway or the relevant runway marking. In some such example implementations, the image processing system 206 or another aspect of the system 200 is further configured to apply the mask 212 to a confidence filter 234 that is configured to pass the mask 212 to the corner detector 214 only when the confidence interval 232 is above a threshold confidence interval that is dynamically set based on an operational state 230 of the aircraft 100.

Figure 3:
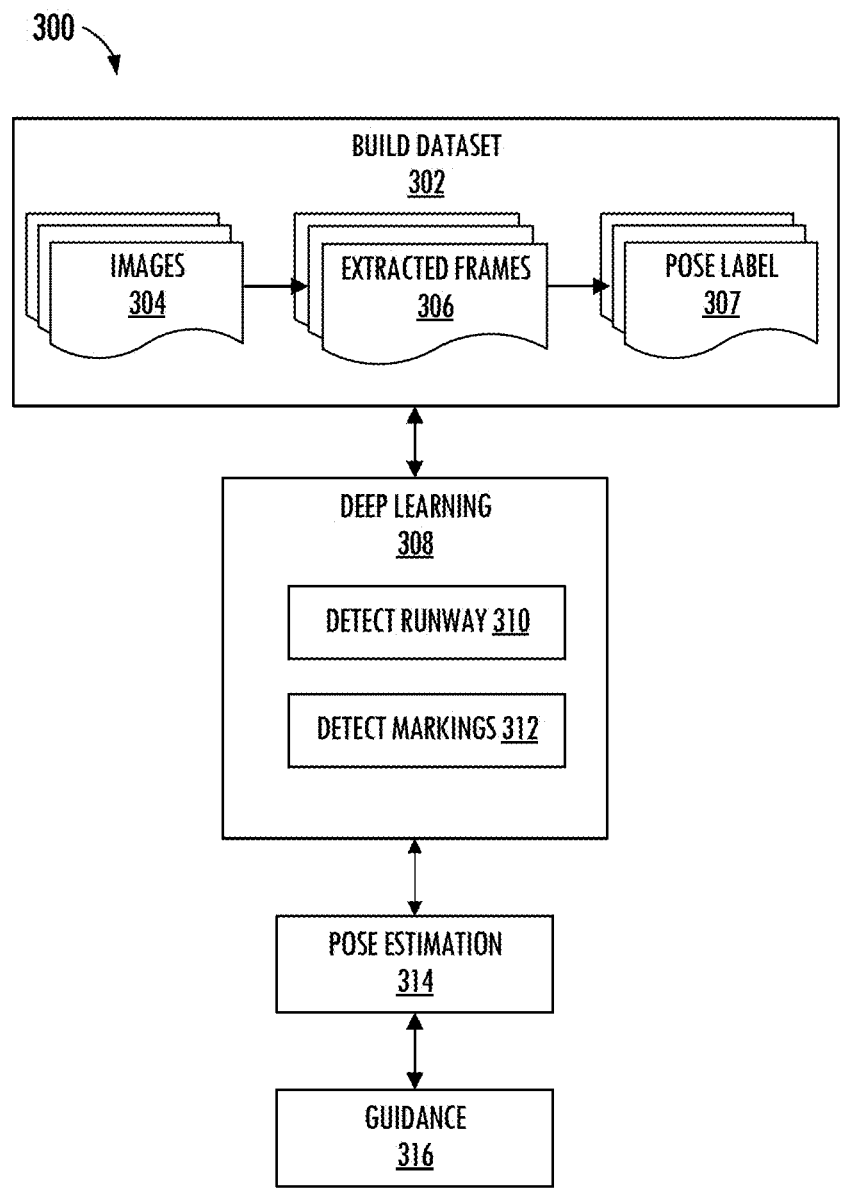
FIG. 3 is a block diagram of a system pipeline that can be used in conjunction with a system for supporting an aircraft approaching a runway on an airfield, according to example implementations of the subject disclosure.

FIG. 3 is a block diagram of a system pipeline 300 that can be used in conjunction with a system, such as system 200, for supporting an aircraft approaching a runway on an airfield, according to example implementations of the subject disclosure. As discussed and otherwise disclosed herein, a sequence of images, such as the sequence of images 204 captured by camera(s) 202, are applied to one or more trained machine learning models (such as first machine learning model 208 and second machine learning model 210, for example) and processed to generate the information that can be used to support the guidance and/or control of an aircraft 100 during landing operations. The system pipeline 300 illustrated in FIG. 3 presents an example approach to acquiring and processing information used to train the machine learning models and to provide the information used in the guidance and control of the aircraft.

As shown in FIG. 3, the system pipeline 300 includes block 302, which involves building a dataset that can be used to train the one or more machine learning models. In some example implementations of block 302, images 304 (which can include one or more instances of the sequence of images 204) are processed to generate a set of extracted frames 306. In some example implementations, the extracted frames 306 include frames from various sequences of images, and can include depictions of one or more features that the one or more machine learning models are to be trained to detect. For example, the extracted frames 306 can include various views of a runway, runway markings, and/or other image elements that are relevant to the detection of the presence or absence of a runway or runway marking in an image. The extracted frames 306 are then annotated with one or more pose labels 307, such that the pose labels 307 and the information associated with a given pose are linked to the corresponding image in the extracted frames 306.

As shown in FIG. 3, the system pipeline 300 also includes block 308 which involves using the images 304 and/or the extracted frames 306 as part of a dataset used in the deep learning and training of the relevant machine learning models (e.g., 208, 210). Any approach to deep learning appropriate for use with the relevant machine learning model can be used in connection with example implementations of block 308. In some example implementations, at least one model is trained using a deep learning approach at block 310 to detect a runway and/or parts of a runway. In some example implementations, at least one model is trained using a deep learning approach at block 312 to detect one or more runway markings.

As shown in FIG. 3, the system pipeline 300 also includes block 314, which involves pose estimation. In some example implementations of block 314, the trained machine learning model, such as the first machine learning model 208 and/or the second machine learning model 210 for example, are configured to a generate a mask and/or an image processed in conjunction with a generated mask in a defined format that can be used to perform a pose estimation. For example, the perspective-n-point system 216 can receive the mask 212 and/or a version of the image 204A processed in conjunction with the mask and generate the pose estimate 218, correlating the relevant interest points on the image to their associated points on the runway itself. At block 316, the pose estimate is output in a form that can be used as guidance and/or other information that can be used by the aircraft 100 or a pilot thereof in connection with landing operations.

Figure 4A:
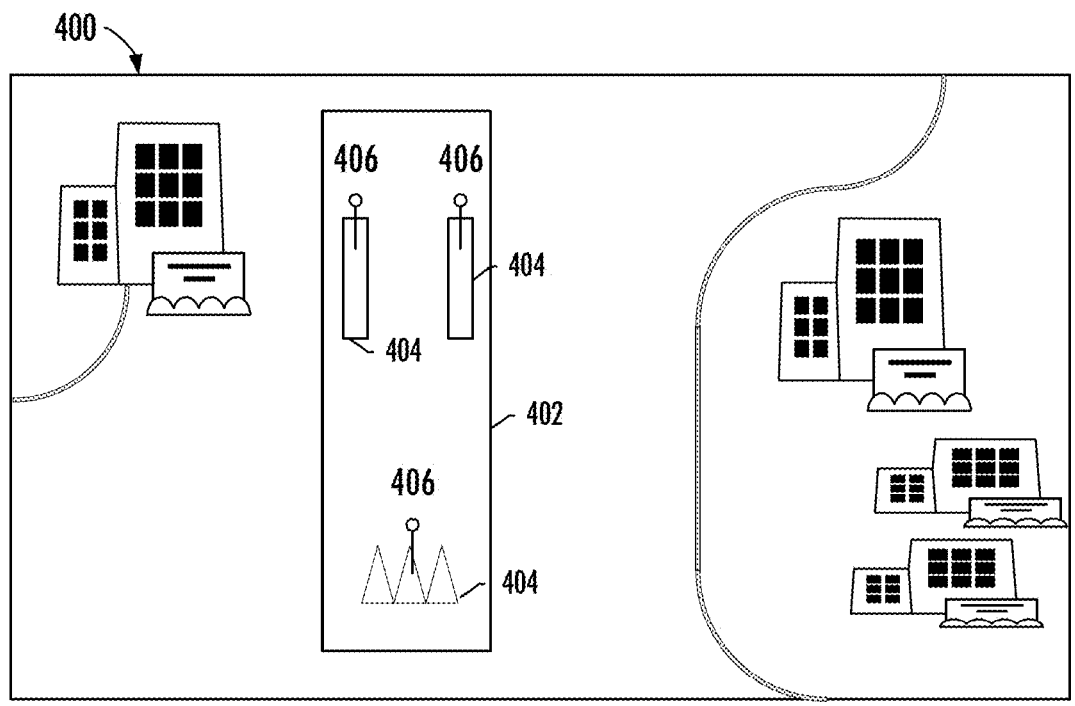
FIG. 4A is a block diagram of an image of an airfield that can be used in conjunction with example implementations of the subject disclosure.

FIG. 4A depicts an airfield 400 at which example implementations of the subject disclosure can be deployed and which illustrates aspects of the subject disclosure. As shown in FIG. 4, the airfield 400 includes a runway 402 that is configured to allow aircraft, such as the aircraft 100, to land. As shown in FIG. 4A, the runway 402 also includes one or more runway marking 404. It will be appreciated that the runway markings 404 shown in FIG. 4A are non-exclusive examples of the runway markings that can be on a given runway, and other markings, such as letters, numbers, lines, curves patterns, geometric shapes, and the like can be used in implementations of the runway markings. FIG. 4A also illustrates points 406 that represent known locations on the runway 402 and/or runway markings 404. In some example implementations, the location of the points 406 is known and expressed in runway-framed coordinates.

Figure 4B:
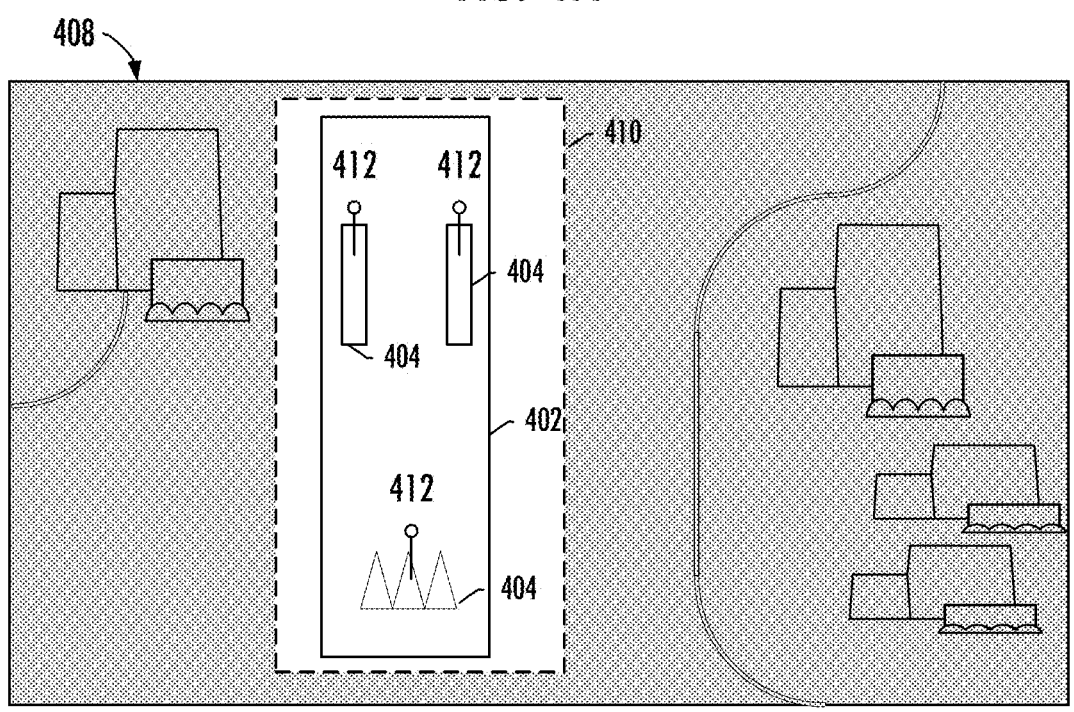
FIG. 4B is a block diagram of an image of an airfield illustrating example implementations of the subject disclosure.

FIG. 4B shows an image 408 of the airfield 400, in accordance with some example implementations of the subject disclosure. In some example implementations, the image 408 can be one image 204A in a sequence of images 204 captured by the camera 202 on the aircraft 100 when approaching the airfield 400. As shown in FIG. 4B, the image 408 depicts a view of the runway 402 and a view of one or more of the runway markings 404. While the example image in FIG. 4B depicts a view of the entirety of the runway 402, it will be appreciated that in some implementations, an image can provide a partial view of the runway 402 and/or the runway markings 404, depending on the position of the aircraft 100 and/or the camera 202, and the conditions in the environment surrounding the airfield.

As shown in FIG. 4B, a mask 410 (e.g., mask 212) is applied to the image 408 identifying the region of the image 408 that includes the runway 402 and/or one or more runway markings 404. A set of interest points 412 is also present on the image, corresponding to parts of the runway and/or runway markings in the image 408. In some example implementations of the subject disclosure, the interest points 412 are identified in the image 408 and then matched to the corresponding points 406 that have known, runway-framed coordinates.

As discussed and otherwise disclosed herein, the interest points 412 identified in a given image 408 and the corresponding known, runway-framed coordinates 406 at a relevant airfield 400 are used with a perspective-n-point estimation to determine a current pose estimate 218 of the camera 202, and thereby the aircraft 100, relative to the runway 402 or the runway marking 404.

A perspective-n-point estimation can be used to find a deterministic solution that maps real world points to pixel value locations in a given image of the environment in which the real-world points are located. A camera matrix associated with a given camera (such as camera 202, for example) can be expressed as a scaling and principle point matrix, A, and can be expressed as set out in Equation 1 below:

$$A = \begin{bmatrix} c_x & 0 & f_x \\ 0 & c_y & f_y \\ 0 & 0 & 1 \end{bmatrix} \quad (1)$$

In Equation 1, the $n^{th}$ point is considered to have real world coordinates $[X_n, Y_n, Z_n]^t$ and camera coordinates $[U_n, V_n, W_n]^t$. The point also exists such that the ray-cast to the W=1 plane intersects at $u_n$, $v_n$. As expressed in Equation 1, $c_x$, $c_y$ are the scaling focal lengths and $f_x$, $f_y$ are the principle points.

The transformation of the $n^{th}$ point from the camera coordinate system to a global coordinate system can be expressed as set out in Equation 2 below:

$$\begin{bmatrix} U_n \\ V_n \\ W_n \end{bmatrix} = R \begin{bmatrix} X_n \\ Y_n \\ Z_n \end{bmatrix} + T \quad (2)$$

In Equation 2, R is the relevant basis rotation matrix and T is a translation vector. Consequently, the projection for the point in the camera coordinate system to the plane W=1 can be expresses as set out in Equation 3 below:

$$\begin{bmatrix} u_n \\ v_n \\ 1 \end{bmatrix} = \frac{1}{s} A \begin{bmatrix} U_n \\ V_n \\ W_n \end{bmatrix} \quad (3)$$

In Equation 3, s is an unknown scaling factor. To produce a transformation from real world coordinate to the projection on the image plane, Equations 1, 2, and 3 can be combined and expressed as set out in Equation 4 below:

$$s \begin{bmatrix} u_n \\ v_n \\ 1 \end{bmatrix} = AR \begin{bmatrix} X_n \\ Y_n \\ Z_n \end{bmatrix} + T \quad (4)$$

As expressed in Equation 4, the scaling factors, the values of the rotation matrix R, and the translation vector T are unknown. However, example implementations of the subject disclosure involve solving for the unknowns in equations. For example, the perspective-n-point system 216 can use an interative algorithmic or programmatic approach. One such approach involving receives four or more mappings of pixel-to-real world coordinates and solving for the unknowns. In some such approaches, the values returned from a given algorithm or program are the rotation and translation vectors to move from global coordinates to camera coordinates. In example implementations that are directed to estimating the camera 202 position (or the aircraft 100 position) relative to a desired real world landing position (which is expressed with a global coordinate system origin), the camera's coordinate system origin must be transformed into global coordinate points. This transformation can be expressed as set out in Equation 5 below:

$$\begin{bmatrix} 0 \\ 0 \\ 0 \end{bmatrix} = R \begin{bmatrix} X_{plane} \\ Y_{plane} \\ Z_{plane} \end{bmatrix} + T \qquad (5)$$

Equation 5 can be adjusted to directly determine rectilinear positioning of the aircraft 100 (which is equipped with camera 202) relative to the landing point origin, as expressed in Equation 6 below:

$$[R^{-1}][-T] = \begin{bmatrix} X_{plane} \\ Y_{plane} \\ Z_{plane} \end{bmatrix} \qquad (6)$$

In some example implementations, a difference matrix is constructed and the change in order of conventional aircraft Euler angles is taken into account to determine the attitude of a given aircraft 100 from the rotation matrix output. The rotation matrix from the camera coordinate system to an airplane coordinate system that represents steady-level-flight can be expressed as set out in Equation 7 below:

$$R_{slf} = \begin{bmatrix} 1 & 0 & 0 \\ 0 & 0 & 1 \\ 0 & -1 & 0 \end{bmatrix} \qquad (7)$$

In such example implementations, the difference matrix between the output of SolvePnP and steady-level-flight can be expressed as set out in Equation 8 below:

$$R_{diff} = [R_{slf}][R] \qquad (8)$$

It will be appreciated that the difference matrix reveals the rotation matrix that would be used to change from steady-level-flight to the current attitude of the aircraft 100. In some example implementations, this rotation matrix is still in the basis of the camera coordinate system, while aircraft attitude is conventionally applied in a 3-2-1 Euler angle order (yaw, then pitch, then roll). For the order to hold true in the equations presented herein, the Euler angle order is taken as 2-1-3 (such that [X; Y; Z] maps to [W, U, V]. The combined rotation matrix with a roll of φ, a pitch of θ, and a yaw of ψ can be expressed in camera coordinates as set out in Equation 9 below:

$$R_{diff} = R_z(\phi) R_x(\theta) R_y(\psi) \qquad (9)$$

Equation 9 can be expanded and expressed as set out in Equation 10 below:

$$R_{diff} = \begin{bmatrix} \cos(\phi) & \sin(\phi) & 0 \\ -\sin(\phi) & \cos(\phi) & 0 \\ 0 & 0 & 1 \end{bmatrix} \begin{bmatrix} 1 & 0 & 0 \\ 0 & \cos(\theta) & \sin(\theta) \\ 0 & -\sin(\theta) & \cos(\theta) \end{bmatrix} \begin{bmatrix} \cos(\psi) & 0 & -\sin(\psi) \\ 0 & 1 & 0 \\ \sin(\psi) & 0 & \cos(\psi) \end{bmatrix} \qquad (10)$$

The matrices in Equation 10 can be multiplied together to establish the following terms set out below in Equation 11, Equation 12, and Equation 13 below:

Equation 11:

$$R_{diff,21} = -\sin(\theta) \qquad (11)$$

Equation 12:

$$R_{diff,20} = \sin(\psi)\cos(\theta) \qquad (12)$$

Equation 13:

$$R_{diff,01} = \sin(\phi)\cos(\theta) \qquad (13)$$

In some example implementations, the terms from Equations 11, 12, and 13 are used to determine the attitude of the aircraft 100 in conventional airplane coordinates from the difference matrix, which in turn can be used to allow the system 200 to generate information used in the guidance and/or control of the aircraft as it approaches the airfield 400 and the runway 402 thereon.

Figure 5:
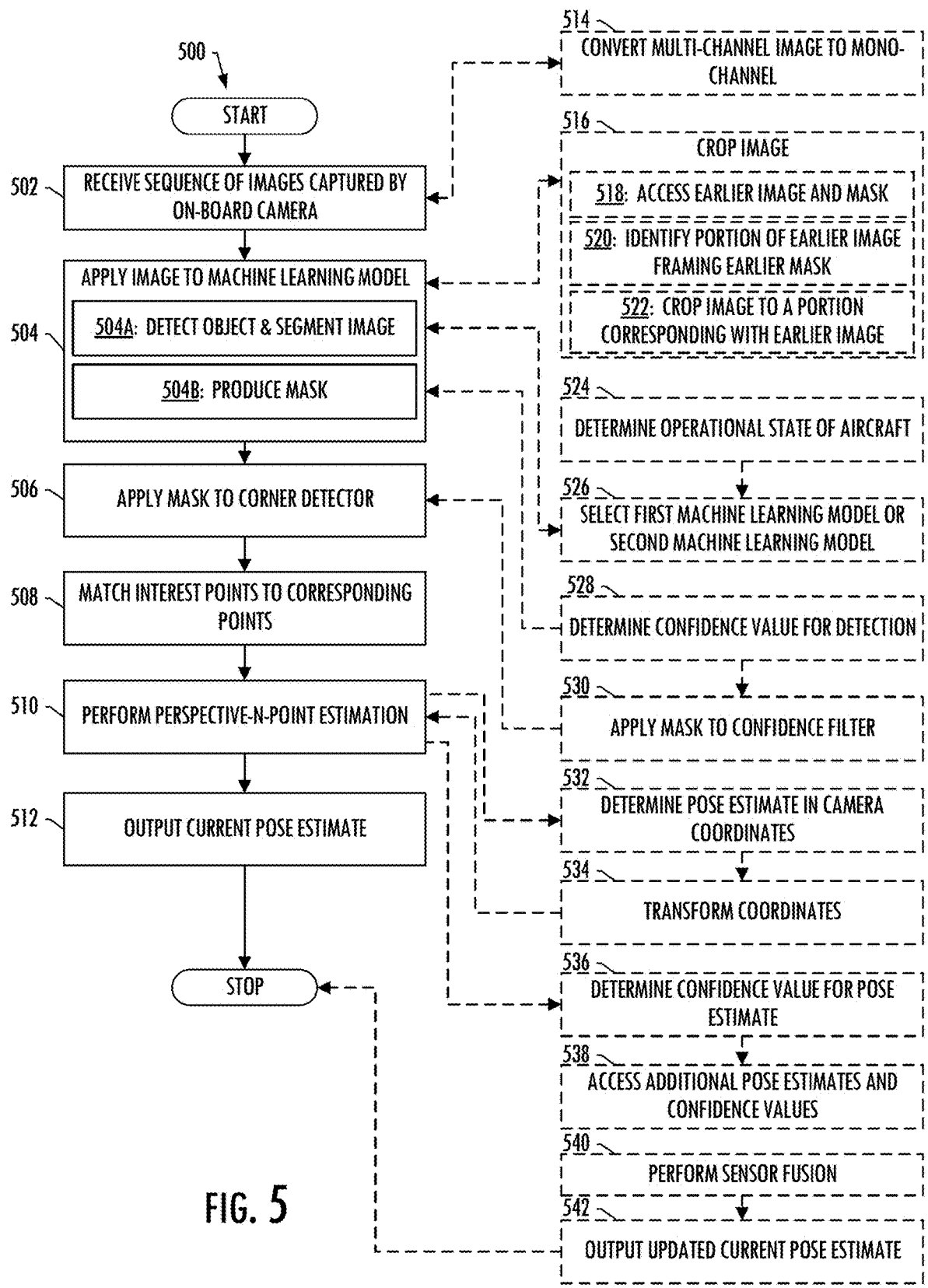
FIG. 5 is a flowchart illustrating various steps in a method for supporting an aircraft approaching a runway on an airfield, according to example implementations of the subject disclosure.

FIG. 5 is a flowchart illustrating various steps in a method 500 of supporting an aircraft 100 approaching a runway 402 on an airfield 400, according to example implementations of the subject disclosure. As shown at block 502, the method includes receiving a sequence of images captured by an on-board camera(s). Some example implementations of block 502 involve receiving a sequence of images of the airfield, captured by a camera onboard the aircraft approaching the runway. In some such example implementations, the image processing system 206 receives the sequence of images 204 that were captured by the camera 202, which is onboard the aircraft 100 approaching the runway 400.

As shown at block 504, the method 500 includes, for at least one image of the sequence of images, applying the image to a machine learning model. Some example implementations of block 504 involve applying the image to a machine learning model trained to perform an object detection and segmentation in which the runway on the airfield, or a runway marking on the runway, is detected in the image, and in which a mask is produced that includes a segment of pixels of the image assigned to an object class for the runway or the runway marking. In some such example implementations, the image 204A is applied by the image processing system 206 or another aspect of the system 200 to a machine learning model, such as the first machine learning model 208 or the second machine learning model 210 to perform an object detection and segmentation and produce the mask 212.

As discussed herein with respect to block 504, some example implementations of the method 500 include detecting an object and segmenting the image, as shown at block 504A. Some example implementations of block 504A involve performing an object detection. For example, the first machine learning model 208 or the second machine learning model 210 can be trained and configured to detect the runway 402 or runway markings 404, and can further identify interest points 412 in the image 204A and/or the image 408.

In some example implementations, as shown at block 504B, the method 500 includes producing a mask. Some example implementations of block 504B involve performing a segmentation to produce the mask. For example, the first machine learning model 208 or the second machine learning model 210 can be trained and configured to produce a mask, such as mask 212 or mask 410. In some such example implementations the mask includes a segment of pixels of the image assigned to an object class for the relevant runway or the relevant runway marking. In some example implementations, the object detection and segmentation is a one-class object detection and segmentation in which only the runway or the runway marking is detected in the image, and the mask only includes the segment of pixels of the image assigned to the object class for the runway or the runway marking. In some example implementations, the object detection and segmentation is a multi-class object detection and segmentation in which the runway and the runway marking are detected in the image, and the mask includes segments of pixels of the image assigned to object classes for the runway and the runway marking, the interest points including interest points on the runway and the runway marking.

As shown at block 506, the method 500 includes applying the mask to a corner detector. Some example implementations of block 506 involve applying the mask to a corner detector to detect interest points on the mask and thereby the runway or the runway marking in the image. In some such example implementations, the image processing system 206 or another aspect of the system 200 applies the mask 212 to the corner detector 214 to detect interest points on the mask 212. With reference to FIG. 4B, the interest points can be the interest points 412 on the mask 410, for example.

As shown at block 508, the method 500 includes matching interest points in the image to corresponding real world points. Some example implementations of block 508 involve matching the interest points on the runway or the runway marking in the image, to corresponding points on the runway or the runway marking that have known runway-framed local coordinates. For example, the image processing system 206 or another aspect of the system 200 can be configured to match the interest points 412 in the image 408 to the corresponding points 406 on the runway 402 or the runway markings 404.

As shown at block 510, the method 500 includes performing a perspective-n-point estimation. Some example implementations of block 510 involve performing a perspective-n-point estimation, using the interest points and the known runway-framed local coordinates, to determine a current pose estimate of the camera and thereby the aircraft relative to the runway or the runway marking. For example, the perspective-n-point system 216 can determine a current pose estimate 218 of the camera 202 by using the interest points 412 and the known runway-framed local coordinates of points 236 or 406 to ascertain the pose of the aircraft 100 relative to the runway 402 or the runway markings 404.

As shown at block 512, the method 500 includes outputting the current pose estimate. Some example implementations of block 512 involve outputting the current pose estimate for use in at least one of guidance or control of the aircraft on a final approach. For example, the system 200 can be configured to cause the pose estimate 218 to be output to the guidance system 220 (e.g., including a GUI or other display device) or the control system 222, where the pose estimate can be used to guide or control the aircraft 100 on a final approach to the airfield 400.

In some example implementations, the method 500 can include one or more additional blocks. For example, in some implementations, the method includes, as shown in block 514, converting a multi-channel image to a mono-channel image. Some example implementations of block 514 involve situations where the image is a multi-channel image, and the method further comprises converting the multi-channel image to a mono-channel image. For example, the image processing system 206 or another aspect of the system 200 can convert the image 204A from a color image to a monochromic image. In another example, the image 204A can be an image captured by a thermal camera, and the multi-channel thermal image can be converted to a single channel image.

In some example implementations, the method 500 includes, as shown in block 516, cropping the image. Some example implementations of block 516 involve cropping the image to reduce a field of view of the camera, and magnify only a portion of the airfield on which the runway or the runway marking is located, before the image is applied to the machine learning model. For example, the image processing system 206 or another aspect of the system 200 can crop the image 204A to reduce a field of view of the camera 202 and magnify only a portion of the airfield 400 on which the runway 402 or the runway marking 404 is location before the image is applied the first machine learning model 208 and/or the second machine learning model 210.

In some example implementations involving cropping, the method 500 includes, as shown in block 518, accessing an earlier image and mask. Some example implementations of block 518 involve accessing an earlier image in the sequence of images, and an earlier mask includes a respective segment of pixels of the earlier image assigned to the object class for the runway or the runway marking. For example, the image processing system 206 or another aspect of the system 200 can access the earlier image 204B from the sequence of images 204, and an earlier mask 212A that includes a respective segment of pixels of the earlier image assigned to the object class for the runway 402 or the runway marking 404.

In some example implementations involving cropping, the method 500 includes, as shown in block 520, identifying a portion of an earlier image framing an earlier mask. Some example implementations of block 520 involve identifying a portion of the earlier image that frames the earlier mask, and thereby the portion of the airfield on which the runway is located. For example, the image processing system 206 or some other portion of the system 200 can be configured to identify a portion of the earlier image 204B that frames the earlier mask 212A, and thereby a portion of the airfield 400 on which the runway 402 is located.

In some example implementations involving cropping, the method 500 includes, as shown in block 522 cropping the image to a portion corresponding with the earlier image. In some example implementations of block 522, cropping the image comprises cropping the image to a portion of the image that corresponds to the portion of the earlier image. For example, the image processing system 206 or another aspect of the system 200 can be configured to crop the image 204A to a portion of the image that corresponds to a portion of the earlier image 204B, such as the portion that frames the earlier mask 212A.

In some example implementations, the method 500 includes, as shown in block 524, determining an operational state of the aircraft. For example, the system 200 can be configured to determine an operational state 230 of the aircraft 100. In some example implementations, the system can receive information associated with the operational state of the aircraft from one or more high level systems of the aircraft 110 and/or from one or more additional information sources 226.

In some example implementations, the method 500 includes, as shown in block 526, selecting a first machine learning model or a second machine learning model. Some example implementations of block 526 involve selecting a first machine learning model or a second machine learning model as the machine learning model to which the image is applied, the first machine learning model trained to perform a one-class object detection and segmentation, and the second machine learning model trained to perform a multi-class object detection and segmentation. For example, the image processing system 206 or another aspect of the system 200 can be configured to select the first machine learning model 208 or the second machine learning model 210 as the machine learning model to which the image 204A is applied, where the first machine learning model trained to perform a one-class object detection and segmentation, and the second machine learning model trained to perform a multi-class object detection and segmentation.

In some example implementations, the method 500 includes, as shown in block 528, determining a confidence interval for the object detection. Some example implementations of block 528 involve the machine learning model being further configured to determines a confidence interval associated with detection of the runway or the runway marking. For example, the first machine learning model 208 and/or the second machine learning model 210 can be configured to determine the confidence interval 232 associated with the detection of the runway 402 or the runway marking 404.

In some example implementations, the method 500 includes, as shown in block 530, applying the mask to a confidence filter. Some example implementations of block 530 involve applying the mask to a confidence filter that passes the mask to the corner detector only when the confidence interval is above a threshold confidence interval that is dynamically set based on an operational state of the aircraft. For example, the image processing system 206 or another aspect of the system 200 can be configured to apply the mask 212 to the confidence filter 234, which is configured to pass the mask to the corner detector 214 only when the confidence interval 232 is above a threshold confidence interval that is dynamically set by the image processing system or another aspect of the system 200 based on the operational state 230 of the aircraft 100

In some example implementations, the method 500 includes, as shown in block 532, determining the pose estimate in camera coordinates. Some example implementations of block 532 involve performing the perspective-n-point estimation by at least determining the current pose estimate of the camera in camera coordinates. For example, the perspective-n-point system 216 or another aspect of the system 200 can be configured to determine the current pose estimate 218 of the camera 202.

In some example implementations, the method 500 includes, as shown in block 534, transforming camera coordinates to runway-framed coordinates. Some example implementations of block 534 involve transforming the camera coordinates to corresponding runway-framed local coordinates that are output for use in the at least one of guidance or control of the aircraft. For example, the perspective-n-point system 216 or another aspect of the system 200 can be configured to transform the camera coordinates to runway framed coordinates 236 that are output by the perspective-n-point system or another aspect of the system 200 for use by the guidance system 220, the control system 222, or another high level system 110 of the aircraft 100.

In some example implementations, the method 500 includes, as shown in block 536, determining a confidence interval for the pose estimate. In some example implementations, a confidence interval can take the form of a multi-dimensional confidence matrix. Some example implementations of block 536 involve performing the perspective-n-point estimation by at least further determining a confidence interval associated with the current pose estimate. For example, the perspective-n-point system 216 or another aspect of the system 200 can be configured to determine the confidence interval 228 associated with the current pose estimate 218.

In some example implementations, the method 500 includes, as shown in block 538, accessing additional pose estimates and confidence intervals. Some example implementations of block 538 involve accessing one or more additional pose estimates and associated confidence intervals. For example, the perspective-n-point system 216 or another aspect of the system 200 can be configured to access one or more additional pose estimates 218A, and one or more associated confidence intervals 228A.

In some example implementations, the method 500 includes, as shown in block 540, performing a sensor fusion. Some example implementations of block 540 involve performing a sensor fusion of the current pose estimate and the one or more additional pose estimates, using the confidence interval and the associated confidence interval, to generate an updated current pose estimate. For example, the perspective-n-point system 216 or another aspect of the system 200 can be configured to perform a sensor fusion of the current pose estimate 218 and at least the additional pose estimate 218A and the confidence interval 228 and at least the associated confidence interval 228A to generate the updated pose estimate 218B.

In some example implementations, the method 500 includes, as shown in block 542, outputting the updated current pose estimate. Some example implementations of block 542 involve outputting the updated current pose estimate for use in the at least one of guidance or control of the aircraft. For example, the perspective-n-point system 216 or another aspect of the system 200 can be configured to output the updated pose estimate 218B for use by the guidance system 220, the control system 222, or another high level system 110 of the aircraft 100.

According to example implementations of the subject disclosure, the system 200 and its subsystems including the camera 202, pose estimate system 205, image processing system 206, first machine learning model 208, second machine learning model 210, corner detector 214, perspective-n-point system 216, guidance system 220, control system 222, and confidence filter 234 can be implemented by various means. Means for implementing the system and its subsystems can include hardware, alone or under direction of one or more computer programs from a computer-readable storage medium. In some examples, one or more apparatuses can be configured to function as or otherwise implement the system and its subsystems shown and described herein. In examples involving more than one apparatus, the respective apparatuses can be connected to or otherwise in communication with one another in a number of different manners, such as directly or indirectly via a wired or wireless network or the like.

Figure 6:
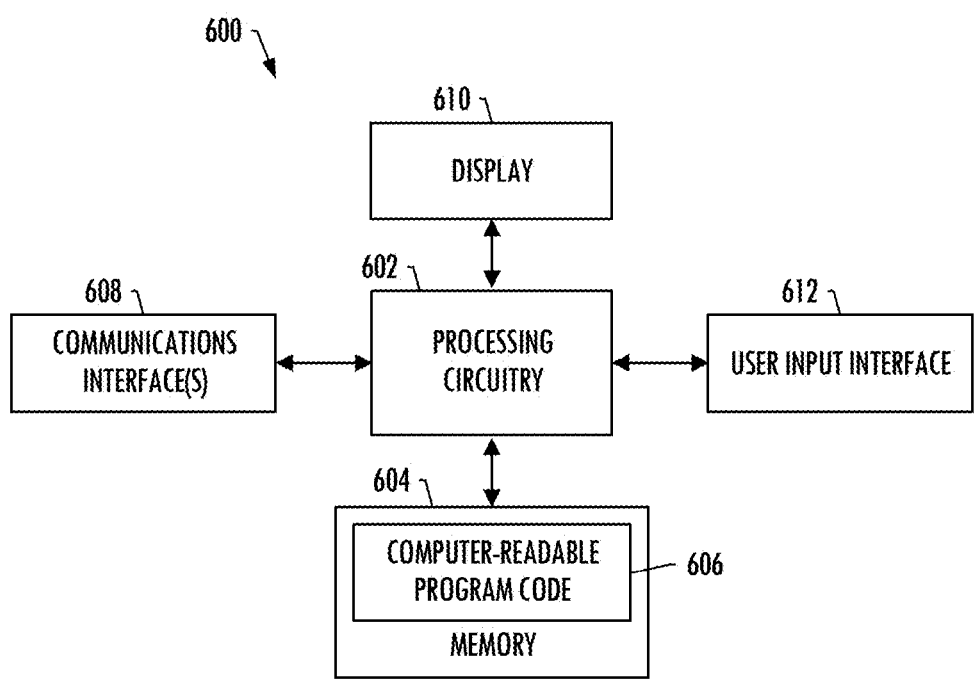
FIG. 6 illustrates an apparatus according to some example implementations of the subject disclosure.

FIG. 6 illustrates an apparatus 600 according to some example implementations of the subject disclosure. Generally, an apparatus of exemplary implementations of the subject disclosure can comprise, include or be embodied in one or more fixed or portable electronic devices. Examples of suitable electronic devices include a smartphone, tablet computer, laptop computer, desktop computer, workstation computer, server computer or the like. The apparatus can include one or more of each of a number of components such as, for example, processing circuitry 602 (e.g., processor unit) connected to a memory 604 (e.g., storage device).

The processing circuitry 602 can be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which can be packaged as an integrated circuit or multiple interconnected integrated circuits (an integrated circuit at times more commonly referred to as a "chip"). The processing circuitry can be configured to execute computer programs, which can be stored onboard the processing circuitry or otherwise stored in the memory 604 (of the same or another apparatus).

The processing circuitry 602 can be a number of processors, a multi-core processor or some other type of processor, depending on the particular implementation. Further, the processing circuitry can be implemented using a number of heterogeneous processor systems in which a main processor is present with one or more secondary processors on a single chip. As another illustrative example, the processing circuitry can be a symmetric multi-processor system containing multiple processors of the same type. In yet another example, the processing circuitry can be embodied as or otherwise include one or more ASICs, FPGAs or the like. Thus, although the processing circuitry can be capable of executing a computer program to perform one or more functions, the processing circuitry of various examples can be capable of performing one or more functions without the aid of a computer program. In either instance, the processing circuitry can be appropriately programmed to perform functions or operations according to example implementations of the subject disclosure.

The memory 604 is generally any piece of computer hardware that is capable of storing information such as, for example, data, computer programs (e.g., computer-readable program code 606) and/or other suitable information either on a temporary basis and/or a permanent basis. The memory can include volatile and/or non-volatile memory, and can be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks can include compact disk-read only memory (CD-ROM), compact disk-read/write (CD-R/W), DVD or the like. In various instances, the memory can be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein can generally refer to a computer-readable storage medium or computer-readable transmission medium.

In addition to the memory 604, the processing circuitry 602 can also be connected to one or more interfaces for displaying, transmitting and/or receiving information. The interfaces can include a communications interface 608 (e.g., communications unit) and/or one or more user interfaces. The communications interface can be configured to transmit and/or receive information, such as to and/or from other apparatus(es), network(s) or the like. The communications interface can be configured to transmit and/or receive information by physical (wired) and/or wireless communications links. Examples of suitable communication interfaces include a network interface controller (NIC), wireless NIC (WNIC) or the like.

The user interfaces can include a display 610 and/or one or more user input interfaces 612 (e.g., input/output unit). The display can be configured to present or otherwise display information to a user, suitable examples of which include a liquid crystal display (LCD), light-emitting diode display (LED), plasma display panel (PDP) or the like. The user input interfaces can be wired or wireless, and can be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces can further include one or more interfaces for communicating with peripherals such as printers, scanners or the like.

As indicated above, program code instructions can be stored in memory, and executed by processing circuitry that is thereby programmed, to implement functions of the systems, subsystems, tools and their respective elements described herein. As will be appreciated, any suitable program code instructions can be loaded onto a computer or other programmable apparatus from a computer-readable storage medium to produce a particular machine, such that the particular machine becomes a means for implementing the functions specified herein. These program code instructions can also be stored in a computer-readable storage medium that can direct a computer, a processing circuitry or other programmable apparatus to function in a particular manner to thereby generate a particular machine or particular article of manufacture. The instructions stored in the computer-readable storage medium can produce an article of manufacture, where the article of manufacture becomes a means for implementing functions described herein. The program code instructions can be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions can be performed sequentially such that one instruction is retrieved, loaded and executed at a time. In some example implementations, retrieval, loading and/or execution can be performed in parallel such that multiple instructions are retrieved, loaded, and/or executed together. Execution of the program code instructions can produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 600 can include a processing circuitry 602 and a computer-readable storage medium or memory 604 coupled to the processing circuitry, where the processing circuitry is configured to execute computer-readable program code 606 stored in the memory. It will also be understood that one or more functions, and combinations of functions, can be implemented by special purpose hardware-based computer systems and/or processing circuitry which perform the specified functions, or combinations of special purpose hardware and program code instructions.

Further, the disclosure comprises embodiments according to the following clauses:

Clause 1: An apparatus for supporting an aircraft approaching a runway on an airfield, the apparatus comprising: a memory configured to store computer-readable program code; and processing circuitry configured to access the memory, and execute the computer-readable program code to cause the apparatus to at least: receive a sequence of images of the airfield, captured by a camera onboard the aircraft approaching the runway; and for at least an image of the sequence of images, apply the image to a machine learning model trained to perform an object detection and segmentation in which the runway on the airfield, or a runway marking on the runway, is detected in the image, and in which a mask is produced that includes a segment of pixels of the image assigned to an object class for the runway or the runway marking; apply the mask to a corner detector to detect interest points on the mask and thereby the runway or the runway marking in the image; match the interest points on the runway or the runway marking in the image, to corresponding points on the runway or the runway marking that have known runway-framed local coordinates; perform a perspective-n-point estimation, using the interest points and the known runway-framed local coordinates, to determine a current pose estimate of the camera and thereby the aircraft relative to the runway or the runway marking; and output the current pose estimate for use in at least one of guidance or control of the aircraft on a final approach.

Clause 2: The apparatus of Clause 1, wherein the image is a multi-channel image, and the processing circuitry is configured to execute the computer-readable program code to cause the apparatus to further convert the multi-channel image to a mono-channel image.

Clause 3: The apparatus of any of Clauses 1-2, wherein the processing circuitry is configured to execute the computer-readable program code to cause the apparatus to further crop the image to reduce a field of view of the camera, and magnify only a portion of the image on which the runway or the runway marking is located, before the image is applied to the machine learning model.

Clause 4: The apparatus of any of Clauses 1-3, wherein the processing circuitry is configured to execute the computer-readable program code to cause the apparatus to further at least: access an earlier image in the sequence of images, and an earlier mask includes a respective segment of pixels of the earlier image assigned to the object class for the runway or the runway marking; and identify a portion of the earlier image that frames the earlier mask, and thereby the portion of the airfield on which the runway is located, and wherein the apparatus caused to crop the image comprises the apparatus caused to crop the image to a portion of the image that corresponds to the portion of the earlier image.

Clause 5: The apparatus of any of Clauses 1-4, wherein the object detection and segmentation is an at least one-class object detection and segmentation in which only the runway or the runway marking is detected in the image, and the mask only includes the segment of pixels of the image assigned to the object class for the runway or the runway marking.

Clause 6: The apparatus of any of Clauses 1-5, wherein the object detection and segmentation is a multi-class object detection and segmentation in which the runway and the runway marking are detected in the image, and the mask includes segments of pixels of the image assigned to object classes for the runway and the runway marking, the interest points including interest points on the runway and the runway marking.

Clause 7: The apparatus of any of Clauses 1-6, wherein the processing circuitry is configured to execute the computer-readable program code to cause the apparatus to further at least: determine an operational state of the aircraft; and based on the operational state, select a first machine learning model or a second machine learning model as the machine learning model to which the image is applied, the first machine learning model trained to perform an at least one-class object detection and segmentation, and the second machine learning model trained to perform a multi-class object detection and segmentation.

Clause 8: The apparatus of any of Clauses 1-7, wherein the machine learning model is further configured to determine a confidence interval or multi-dimensional confidence matrix associated with detection of the runway or the runway marking, and the processing circuitry is configured to execute the computer-readable program code to cause the apparatus to further apply the mask to a confidence filter that is configured to pass the mask to the corner detector only when the confidence interval is above a threshold confidence interval that is dynamically set based on an operational state of the aircraft.

Clause 9: The apparatus of any of Clauses 1-8, wherein the apparatus caused to perform the perspective-n-point estimation comprises the apparatus caused to determine the current pose estimate of the camera in camera coordinates, and transform the camera coordinates to corresponding runway-framed local coordinates that are output for use in the at least one of guidance or control of the aircraft.

Clause 10: The apparatus of any of Clauses 1-9, wherein the apparatus caused to perform the perspective-n-point estimation further comprises the apparatus caused to determine a confidence interval associated with the current pose estimate, and the processing circuitry is configured to execute the computer-readable program code to cause the apparatus to further at least: access one or more additional pose estimates and associated confidence intervals; perform a sensor fusion of the current pose estimate and the one or more additional pose estimates, using the confidence interval and the associated confidence interval, to generate an updated current pose estimate; and output the updated current pose estimate for use in the at least one of guidance or control of the aircraft.

Clause 11: A method of supporting an aircraft approaching a runway on an airfield, the method comprising: receiving a sequence of images of the airfield, captured by a camera onboard the aircraft approaching the runway; and for at least an image of the sequence of images, applying the image to a machine learning model trained to perform an object detection and segmentation in which the runway on the airfield, or a runway marking on the runway, is detected in the image, and in which a mask is produced that includes a segment of pixels of the image assigned to an object class for the runway or the runway marking; applying the mask to a corner detector to detect interest points on the mask and thereby the runway or the runway marking in the image; matching the interest points on the runway or the runway marking in the image, to corresponding points on the runway or the runway marking that have known runway-framed local coordinates; performing a perspective-n-point estimation, using the interest points and the known runway-framed local coordinates, to determine a current pose estimate of the camera and thereby the aircraft relative to the runway or the runway marking; and outputting the current pose estimate for use in at least one of guidance or control of the aircraft on a final approach.

Clause 12: The method of Clauses 11, wherein the image is a multi-channel image, and the method further comprises converting the multi-channel image to a mono-channel image.

Clause 13: The method of any of Clauses 11-12, further comprising cropping the image to reduce a field of view of the camera, and magnify only a portion of the image on which the runway or the runway marking is located, before the image is applied to the machine learning model.

Clause 14: The method of any of Clauses 11-13, further comprising: accessing an earlier image in the sequence of images, and an earlier mask includes a respective segment of pixels of the earlier image assigned to the object class for the runway or the runway marking; and identifying a portion of the earlier image that frames the earlier mask, and thereby the portion of the airfield on which the runway is located, and wherein cropping the image comprises cropping the image to a portion of the image that corresponds to the portion of the earlier image.

Clause 15: The method of any of Clauses 11-14, wherein the object detection and segmentation is an at least one-class object detection and segmentation in which only the runway or the runway marking is detected in the image, and the mask only includes the segment of pixels of the image assigned to the object class for the runway or the runway marking.

Clause 16: The method of any of Clauses 11-15, wherein the object detection and segmentation is a multi-class object detection and segmentation in which the runway and the runway marking are detected in the image, and the mask includes segments of pixels of the image assigned to object classes for the runway and the runway marking, the interest points including interest points on the runway and the runway marking.

Clause 17: The method of any of Clauses 11-16, further comprising: determining an operational state of the aircraft; and based on the operational state, selecting a first machine learning model or a second machine learning model as the machine learning model to which the image is applied, the first machine learning model trained to perform an at least one-class object detection and segmentation, and the second machine learning model trained to perform a multi-class object detection and segmentation.

Clause 18: The method of any of Clauses 11-17, wherein the machine learning model further determines a confidence interval or multi-dimensional confidence matrix associated with detection of the runway or the runway marking, and the method further comprises applying the mask to a confidence filter that passes the mask to the corner detector only when the confidence interval is above a threshold confidence interval that is dynamically set based on an operational state of the aircraft.

Clause 19: The method of any of Clauses 11-18, wherein performing the perspective-n-point estimation comprises determining the current pose estimate of the camera in camera coordinates, and transforming the camera coordinates to corresponding runway-framed local coordinates that are output for use in the at least one of guidance or control of the aircraft.

Clause 20: The method of any of Clauses 11-19, wherein performing the perspective-n-point estimation further comprises determining a confidence interval associated with the current pose estimate, and the method further comprises: accessing one or more additional pose estimates and associated confidence intervals; performing a sensor fusion of the current pose estimate and the one or more additional pose estimates, using the confidence interval and the associated confidence interval, to generate an updated current pose estimate; and outputting the updated current pose estimate for use in the at least one of guidance or control of the aircraft.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus, comprising:
    a memory configured to store computer-readable program code; and
    processing circuitry configured to access the memory, and execute the computer-readable program code to cause the apparatus to at least:
        receive a sequence of images of an airfield, captured by a camera onboard an aircraft approaching a runway; and for at least an image of the sequence of images,
        apply the image to a machine learning model trained to perform an object detection and segmentation in which at least one of the runway on the airfield, or a runway marking on the runway, is detected in the image, and in which a mask is produced that comprises a segment of pixels of the image that are assigned to an object class for the runway or the runway marking;
        apply the mask to a corner detector to detect one or more interest points on the mask and thereby the runway or the runway marking in the image;
        match the one or more interest points on the runway or the runway marking in the image, to one or more corresponding points on the airfield or the runway marking that have known runway-framed local coordinates; and
        perform a perspective-n-point estimation, using the one or more interest points and the known runway-framed local coordinates, to determine a pose estimate of the camera and thereby the aircraft relative to the runway or the runway marking, wherein the pose estimate is to be utilized in at least one of guidance or control of the aircraft.

2. The apparatus of claim 1, wherein the image is a multi-channel image, and the processing circuitry is configured to execute the computer-readable program code to cause the apparatus to further convert the multi-channel image to a mono-channel image.

3. The apparatus of claim 1, wherein the processing circuitry is configured to execute the computer-readable program code to cause the apparatus to further crop the image to reduce a field of view of the camera, and magnify only a portion of the image on which the runway or the runway marking is located, before the image is applied to the machine learning model.

4. The apparatus of claim 3, wherein the processing circuitry is configured to execute the computer-readable program code to cause the apparatus to further at least:
    access an earlier image in the sequence of images, and an earlier mask comprises a respective segment of pixels of the earlier image assigned to the object class for the runway or the runway marking; and
identify a portion of the earlier image that frames the earlier mask, and thereby the portion of the airfield on which the runway is located, and
wherein the apparatus caused to crop the image comprises the apparatus caused to crop the image to a portion of the image that corresponds to the portion of the earlier image.

5. The apparatus of claim 1, wherein the object detection and segmentation is an at least one-class object detection and segmentation in which only the runway or the runway marking is detected in the image, and the mask only comprises the segment of pixels of the image assigned to the object class for the runway or the runway marking.

6. The apparatus of claim 1, wherein the object detection and segmentation is a multi-class object detection and segmentation in which the runway and the runway marking are detected in the image, and the mask comprises segments of pixels of the image assigned to object classes for the runway and the runway marking, the one or more interest points comprising first interest points on the runway and the runway marking.

7. The apparatus of claim 1, wherein the processing circuitry is configured to execute the computer-readable program code to cause the apparatus to further at least:
determine an operational state of the aircraft; and based on the operational state,
select a first machine learning model or a second machine learning model as the machine learning model to which the image is applied, the first machine learning model trained to perform an at least one-class object detection and segmentation, and the second machine learning model trained to perform a multi-class object detection and segmentation.

8. The apparatus of claim 1, wherein the machine learning model is further configured to determine a confidence interval or multi-dimensional confidence matrix associated with detection of the runway or the runway marking, and the processing circuitry is configured to execute the computer-readable program code to cause the apparatus to further apply the mask to a confidence filter that is configured to pass the mask to the corner detector only when the confidence interval is above a threshold confidence interval that is dynamically set based on an operational state of the aircraft.

9. The apparatus of claim 1, wherein the apparatus caused to perform the perspective-n-point estimation comprises the apparatus caused to determine the pose estimate of the camera in camera coordinates, and transform the camera coordinates to corresponding runway-framed local coordinates that are output for use in the at least one of guidance or control of the aircraft.

10. The apparatus of claim 1, wherein the apparatus caused to perform the perspective-n-point estimation further comprises the apparatus caused to determine a confidence interval associated with the pose estimate, and the processing circuitry is configured to execute the computer-readable program code to cause the apparatus to further at least:
access one or more additional pose estimates and associated confidence intervals;
perform a sensor fusion of the pose estimate and the one or more additional pose estimates, using the confidence interval and the associated confidence interval, to generate an updated current pose estimate; and
output the updated current pose estimate for use in the at least one of guidance or control of the aircraft.

11. A method, comprising:
receiving, by a system comprising a processor, a sequence of images of an airfield, captured by a camera onboard an aircraft approaching a runway on the airfield; and for at least an image of the sequence of images,
applying the image to a machine learning model trained to perform an object detection and segmentation in which the runway on the airfield, or a runway marking on the runway, is detected in the image, and in which a mask is produced that comprises a segment of pixels of the image assigned to an object class for the runway or the runway marking;
applying the mask to a corner detector to detect one or more interest points on the mask and thereby the runway or the runway marking in the image;
matching the one or more interest points on the airfield or the runway marking in the image, to corresponding points on the runway or the runway marking that have known runway-framed local coordinates;
based on the one or more interest points and the known runway-framed local coordinates, determining a pose estimate of the aircraft relative to the runway or the runway marking; and
outputting the pose estimate for use in at least one of guidance or control of the aircraft on a final approach.

12. The method of claim 11, wherein the image is a multi-channel image, and the method further comprises converting the multi-channel image to a mono-channel image.

13. The method of claim 11 further comprising cropping the image to reduce a field of view of the camera, and magnifying only a portion of the image on which the runway or the runway marking is located, before the image is applied to the machine learning model.

14. The method of claim 13 further comprising:
accessing an earlier image in the sequence of images, and an earlier mask comprises a respective segment of pixels of the earlier image assigned to the object class for the runway or the runway marking; and
identifying a portion of the earlier image that frames the earlier mask, and thereby the portion of the airfield on which the runway is located, and
wherein cropping the image comprises cropping the image to a portion of the image that corresponds to the portion of the earlier image.

15. The method of claim 11, wherein the object detection and segmentation is an at least one-class object detection and segmentation in which only the runway or the runway marking is detected in the image, and the mask only comprises the segment of pixels of the image assigned to the object class for the runway or the runway marking.

16. The method of claim 11, wherein the object detection and segmentation is a multi-class object detection and segmentation in which the runway and the runway marking are detected in the image, and the mask comprises segments of pixels of the image assigned to object classes for the runway and the runway marking, the interest points comprising first interest points on the runway and the runway marking.

17. The method of claim 11 further comprising:
determining an operational state of the aircraft; and based on the operational state,
selecting a first machine learning model or a second machine learning model as the machine learning model to which the image is applied, the first machine learning model trained to perform a one-class object detection and segmentation, and the second machine learning model trained to perform a multi-class object detection and segmentation.

18. The method of claim 11, wherein the machine learning model further determines a confidence interval or multi-dimensional confidence matrix associated with detection of the runway or the runway marking, and the method further comprises applying the mask to a confidence filter that passes the mask to the corner detector only when the confidence interval is above a threshold confidence interval that is dynamically set based on an operational state of the aircraft.

19. The method of claim 11, wherein performing the perspective-n-point estimation comprises determining the current pose estimate of the camera in camera coordinates, and transforming the camera coordinates to corresponding runway-framed local coordinates that are output for use in the at least one of guidance or control of the aircraft.

20. The method of claim 11, wherein performing the perspective-n-point estimation further comprises determining a confidence interval associated with the current pose estimate, and the method further comprises:
  accessing one or more additional pose estimates and associated confidence intervals;
  performing a sensor fusion of the current pose estimate and the one or more additional pose estimates, using the confidence interval and the associated confidence interval, to generate an updated current pose estimate; and
  outputting the updated current pose estimate for use in the at least one of guidance or control of the aircraft.

* * * * *